J. D. METCALF.
EYEGLASSES.
APPLICATION FILED SEPT. 12, 1910.

1,272,833.

Patented July 16, 1918.

INVENTOR
Jefferson D. Metcalf.

WITNESSES

BY

ATTORNEY

UNITED STATES PATENT OFFICE.

JEFFERSON D. METCALF, OF GILBERT, LOUISIANA, ASSIGNOR OF ONE-HALF TO WILLIAM L. REAM, OF GILBERT, LOUISIANA.

EYEGLASSES.

1,272,833.  Specification of Letters Patent.  Patented July 16, 1918.

Application filed September 12, 1916. Serial No. 119,679.

*To all whom it may concern:*

Be it known that I, JEFFERSON D. METCALF, a citizen of the United States, residing at Gilbert, in the county of Franklin and State of Louisiana, have invented certain new and useful Improvements in Eyeglasses, of which the following is a specification.

This invention relates to an improvement in eyeglasses, and more particularly to devices of this sort of the spectacle type.

An object of my invention is to provide a pair of eyeglasses which embodies frames or rims for the lenses, and which frames are so constructed that the lenses may be very readily placed within and removed from the frame without the use of special tools or implements and also in providing bows fitted to be held on the frames by the means which secures the lenses therein, the bows being thus removably held in place so that they can be renewed at any time that a bow may become bent or broken or it may be desired to change the bow which has been fitted in place for one of a greater or lesser length.

A further object is to so construct the means by which the bows are held in place that adjustment may be made of the bows with respect to the rims to fit the lenses at varied angles which may be desired in use, as where bifocal lenses are fitted in the rims or frames.

A still further object lies in providing special lenses for use with the bows adjustably connected with the frames or rims, and which lenses have portions thereof darkened to provide mirror sections which will reflect persons and objects back of the wearer, the adjustable mounting of the bows permitting adjustment of the angle of the lenses so that the view of the same may be varied at the will of the user.

With the above and other objects in view, my invention consists in certain novel features of construction and combinations of parts which will be hereinafter set forth in connection with the drawings and then more particularly pointed out in the claims.

In the drawings:—

Figure 1:
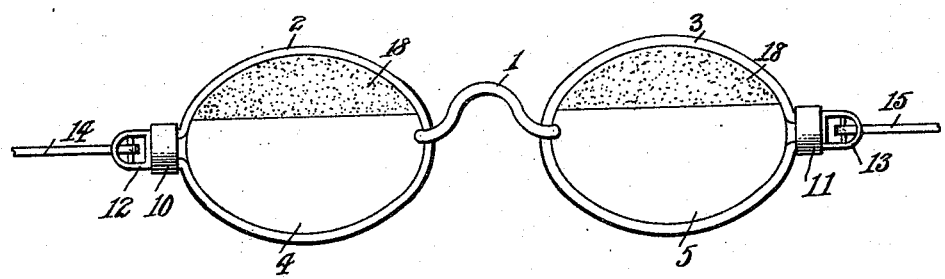
Figure 1 is a view in elevation of a pair of eyeglasses constructed after the manner of my invention and with the parts assembled in the position which they will occupy when in use.
Figure 2:
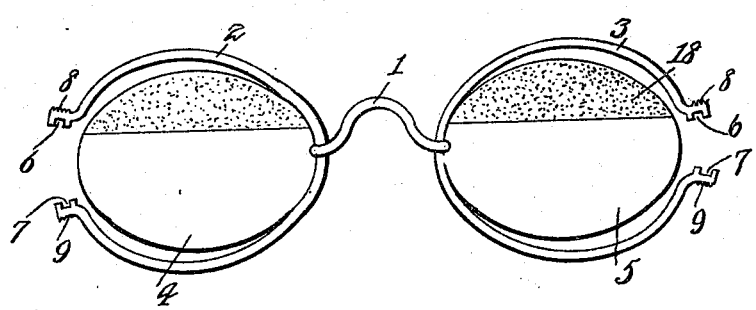
Fig. 2 is a view somewhat similar to Fig. 1 with the bows and the portions which hold the rims secured in place removed.
Figure 3:
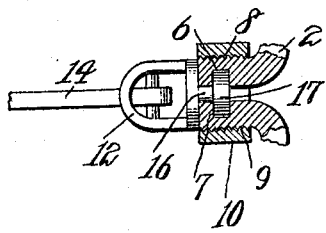
Fig. 3 is a fragmentary sectional view to show the rim and bow securing means more in detail.

In the present disclosure I have shown the nose piece 1 as being of standard form, although it will of course be understood that this nose or bridge piece might be constructed in any approved manner to introduce a broader bearing surface for the nose or to have a protecting or cushion material introduced to hold the bridge piece out of contact with the nose. The rims or frame are connected with the bridge piece 1, and as shown, these rims 2 and 3 are left open at their outer sides and are preferably made of spring metal so that when the fastening means is removed, the rim portions will spring away from the lenses 4 and 5 in the manner shown in Fig. 2 of the drawings.

The adjacent ends of the rim portions 2 and 3 have the notches 6 and 7 therein formed in such positioning that as the ends of the rim portions are brought to the fitted position around the lenses, these notches will register to form an opening. Outer sides of the extending ends of the rim portions 2 and 3 are screw threaded as shown at 8 and 9 in Fig. 2, and it will of course be understood that these screw threads must be cut with the same fitting, or if they are made separately must be proportioned to be of the same threads to the inch and of the same pitch. The internally screw threaded sleeves 10 and 11 are so threaded that they may be fitted over the threaded ends of the rim portions 2 and 3, and thus may hold the rim portions clamped against the edges of the lenses 4 and 5 to secure the same in place.

While the structure as above specified will mount the lenses and will carry the same from the bridge or nose piece 1, it is my intention that bows shall be provided to retain the structure in the proper relation, and with this end in view, the bow mounting members 12 and 13 have the bows 14 and 15 connected therewith to be capable of swinging movement. Each of these bow mounting members has a stem portion 16 formed to project therefrom and a head portion 17 at the inner end of the stem portion, and while the stem and head portions are made of such configuration that they will be received between the ends of the rim members with the head in the notches 6 and 7 and will permit the securing sleeves to be screwed onto the ends of the rim members, they are made substantially round in cross section so that the bow mounting members may be turned and set at varied angular dispositions to dispose the bows at different angles from the plate in which the lenses are disposed. It is of course preferable that the bows 14 and 15 have the ends thereof shaped into hooks to be received over the ears of the wearer, or the bows might be constructed and shaped in any other desired manner so that they would fit properly and would hold the eyeglasses in the desired mounting.

In the present illustration I have shown a pair of special lenses which are so constructed that the upper portion of each lens is darkened on its outer side, as shown at 18, and in this way a mirror surface or a reflecting surface is provided on the upper portion of each lens and at the same time the lower or clear vision portion of the spectacle is not in any wise altered. By this arrangement of the mirror portions on the lenses, the rims may be adjusted to the proper angular disposition with respect to the bows by which the positioning of the lenses is determined, that the proper reflection will be included in the mirror portions of the lenses, and thus by shifting the rims while the glasses are in place, the reflecting portions may be made to take in and place within the view of the eye any person, object, or scene which may be behind the wearer, thus making the eyeglasses particularly well suited for use by watchmen and others who are required to keep a lookout on all sides.

It is believed that the manner of assembling the parts will be clear from the preceding description, however, it might be stated that when the sleeves 10 and 11 are removed over the bow mounting members 12 and 13, the rim portions 2 and 3 are released from the lenses 4 and 5 and at the same time the bow mounting members are disconnected so that substitution may be made for either bow member or both may be changed, and further it will be seen that when the rims are released substitution or replacement of the lenses can be accomplished.

While I have herein shown and described only one specific form of the structure and have set forth only certain mountings and uses, it will of course be understood that a number of variations and modifications might be resorted to in the form and arrangement of the parts as well as in the manner of using and fitting the same, and hence I do not wish to be limited to the exact disclosure, but rather only to such points as may be set forth in the claims.

I claim:

1. A pair of eyeglasses comprising rim portions left open at their outer sides and provided with outstanding ends which are screw threaded exteriorly with a thread common to both, each of the projecting ends being provided with a transverse notch on the inner side, bow mounting members provided with stem and head portions shaped to be fitted between the ends of the rim portions in such relation that the head portions are received in the notches thereof, bows carried by said bow mounting members, and internally screw threaded sleeves arranged to be received over the screw threaded ends of the rim portion to hold the same tightened against the lenses and to secure the bow mounting members in place.

2. A pair of eyeglasses comprising rim portions left open at their outer sides and provided with outstanding ends which are screw threaded exteriorly with a thread common to both, each of the projecting ends being provided with a notch on the inner side and extending transversely, bow mounting members provided with stem and head portions shaped to be fitted between the ends of the rim portions in such relation that the head portions are received in the notches thereof, bows carried by said bow mounting members and having swinging connection therewith, internally screw threaded sleeves arranged to be received over the screw threaded ends of the rim portions to hold the same tightened against the lenses and to secure the bow mounting members in place, and the arrangement of the lenses and the mounting of the bows being such that adjustment of the angular disposition of the lenses before the eyes of the wearer may be made.

In testimony whereof I affix my signature in presence of two witnesses.

JEFFERSON D. METCALF.

Witnesses:
 D. D. GILL,
 J. P. KIPE.